United States Patent

Baumgart et al.

[11] Patent Number: 6,118,886
[45] Date of Patent: Sep. 12, 2000

[54] AUTOMATIC TARGET RECOGNITION APPARATUS AND METHOD

[75] Inventors: Chris W. Baumgart, Santa Fe; Christopher A. Ciarcia, Los Alamos, both of N. Mex.

[73] Assignee: The United States of America as represented by the United States Department of Energy, Washington, D.C.

[21] Appl. No.: 08/039,674

[22] Filed: Mar. 30, 1993

[51] Int. Cl.[7] ................................................ G06K 9/00
[52] U.S. Cl. ........................................ 382/103; 382/304
[58] Field of Search .................................. 382/6, 10, 22, 382/28, 39, 41, 49, 51, 54, 48, 103, 304

[56] References Cited

U.S. PATENT DOCUMENTS

| | | | |
|---|---|---|---|
| 3,638,188 | 1/1972 | Pincoffs et al. | 340/146.3 AC |
| 3,805,028 | 4/1974 | Morton et al. | 235/92 PC |
| 3,947,833 | 3/1976 | Eckstein, Jr. | 382/39 |
| 4,107,648 | 8/1978 | Frank | 340/146.3 H |
| 4,208,652 | 6/1980 | Marshall | 340/146.3 Y |
| 4,433,438 | 2/1984 | Couturier | 382/22 |
| 4,513,440 | 4/1985 | Delman | 382/41 |
| 4,603,430 | 7/1986 | Sacks | 382/28 |
| 4,644,585 | 2/1987 | Crimmins et al. | 382/48 |
| 4,712,248 | 12/1987 | Hongo | 382/22 |
| 4,791,676 | 12/1988 | Flickner et al. | 382/22 |
| 4,817,174 | 3/1989 | Nakatani | 382/22 |
| 4,878,114 | 10/1989 | Huynh et al. | 382/28 |
| 4,897,881 | 1/1990 | Ledinh et al. | 382/28 |
| 4,901,362 | 2/1990 | Terzian | 382/22 |
| 4,979,224 | 12/1990 | Maiocco et al. | 382/8 |
| 5,027,413 | 6/1991 | Barnard | 382/39 |
| 5,040,225 | 8/1991 | Gouge | 382/6 |
| 5,054,101 | 10/1991 | Prakash | 382/50 |
| 5,060,278 | 10/1991 | Fukumizu | 382/14 |
| 5,150,421 | 9/1992 | Morishita et al. | 382/6 |
| 5,181,254 | 1/1993 | Schweizer et al. | 382/54 |
| 5,214,744 | 5/1993 | Schweizer et al. | 382/39 |
| 5,233,541 | 8/1993 | Corwin et al. | 382/54 |

*Primary Examiner*—Jon Chang
*Attorney, Agent, or Firm*—William C. Daubenspeck; Miquel A. Valdes; William R. Moser

[57] ABSTRACT

An automatic target recognition apparatus (10) is provided, having a video camera/digitizer (12) for producing a digitized image signal (20) representing an image containing therein objects which objects are to be recognized if they meet predefined criteria. The digitized image signal (20) is processed within a video analysis subroutine (22) residing in a computer (14) in a plurality of parallel analysis chains such that the objects are presumed to be lighter in shading than the background in the image in three of the chains and further such that the objects are presumed to be darker than the background in the other three chains. In two of the chains the objects are defined by surface texture analysis using texture filter operations. In another two of the chains the objects are defined by background subtraction operations. In yet another two of the chains the objects are defined by edge enhancement processes. In each of the analysis chains a calculation operation independently determines an error factor relating to the probability that the objects are of the type which should be recognized, and a probability calculation operation combines the results of the analysis chains.

19 Claims, 4 Drawing Sheets

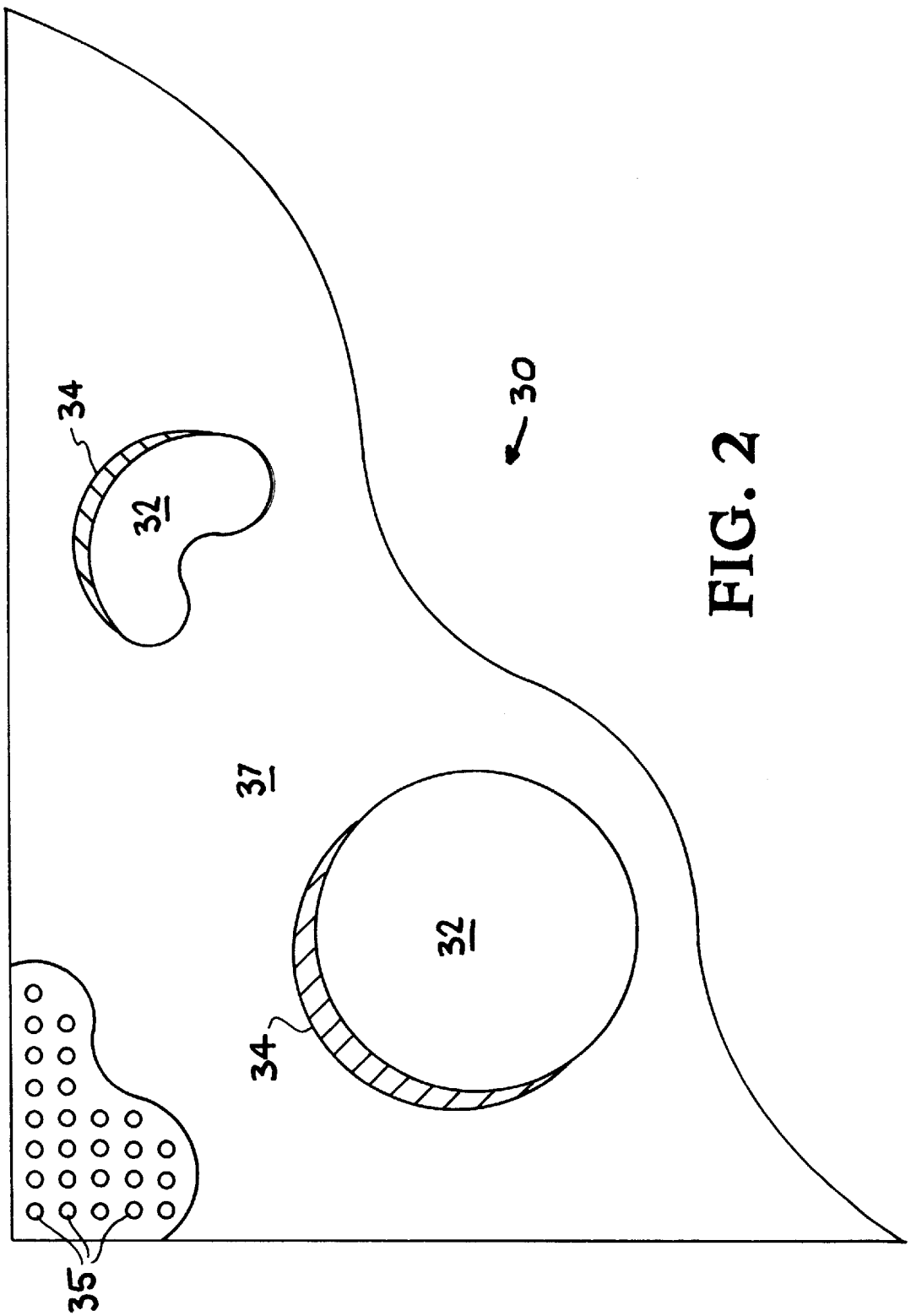

AUTOMATIC TARGET RECOGNITION APPARATUS AND METHOD

BACKGROUND OF THE INVENTION

The invention described herein arose in the course of, or under, contract No. DE-AC08-88NV10617 between the United States Department of Energy and E.G.&G. Energy Measurements, Inc.

The present invention relates generally to electronic data processing and more particularly to a system for attainment and processing of visual images for the purpose of identifying objects within the image.

It is well known that there has been much progress lately in increasing the ability of computers to rapidly manipulate data. However, all of this computing power is frequently limited by the unavailability of relevant input data. Therefore, one of the major current focuses of computer science is to find ways to use some of the available computing power to aid the data input process. Ideally, a computer could be made to communicate with the outside world in much the same manner as does a human being, such as by touching, seeing, hearing, or reading the relevant data. Not only would this make the human/computer interface easier for humans, the ability of computers to interact directly to "real world" stimuli allows us to take advantage of the inherent advantages of computers—such as their ability to analyze data and respond to it more quickly than can a human—in tasks previously thought inappropriate to be handled by computers.

One type of data input which is being incorporated into computer applications is visual recognition. It is a simple matter to "digitize" the output of a video camera such that the image can be introduced into the computer in binary form, and various systems have been devised for accomplishing this. One scan encoding scheme for digitizing a video image is taught by U.S. Pat. No. 4,107,648 issued to Frank. The Frank scheme is particularly useful for encoding data to be used as a picture, in that it requires far less memory to store the image than would be required if a separate value were to be stored for each pixel location in the picture. However, it should be noted that manipulation and/or analysis of data within the picture might be more difficult than would be the case if the data were encoded in a more straight forward scheme.

A variety of means for analyzing the content of a scanned image have been developed. The most extensively developed aspect of this has been in the field of optical character recognition ("OCR") or document recognition, wherein relatively easily distinguishable features of characters, documents, or the like are compared to a library of reference images. An example of document recognition is found in U.S. Pat. No. 4,208,652 issued to Marshall. Additional means have been developed for analyzing specific aspects of a scanned image. An example of a method for analyzing the texture of a scanned image is found in U.S. Pat. No. 5,040,225 issued to Gouge.

The above references are far from an exhaustive listing of the various ways in which previous inventors have realized distinguishable features or characteristics from a digitized video image. Each of the prior art methods has presented a significant advance in the field and, apparently, each has been found to be useful for its intended purpose. However, the science of computerized image recognition is by no means fully developed. One primary problem for which there has previously been no fully satisfactory solution involves the fact that the "real world" contains a nearly infinite variety of changing lighting conditions, background objects, and other potential variations.

No prior art image recognition means or method, to the inventors' knowledge, has successfully provided an effective way to distinguish objects in a complex real world environment. All prior art methods and/or means have either looked for a specific aspect of a video image and/or have compared relatively easily distinguishable features to a library of images.

SUMMARY OF THE INVENTION

Accordingly, it is an object of the present invention to provide an image recognition method and means which can distinguish designated objects in a nearly infinite variety of visual background conditions.

It is another object of the present invention to provide an image recognition method and means which will reliably recognize objects at a high confidence level.

It is still another object of the present invention to provide an image recognition method and means which will take into consideration a variety of the visual attributes of the image.

It is yet another object of the present invention to provide an image recognition method and means which improve recognition reliability with experience.

It is still another object of the present invention to provide an image recognition method and means which will distinguish target objects from the background in low signal to noise ratio conditions.

It is yet another object of the present invention to provide an image recognition method and means which will operate within a high dynamic range of image light levels.

It is still another object of the present invention to provide an image recognition method and means which will compensate for or remove aberrant light source effects, such as shadows.

Briefly, the present invention is an image recognition system which has a digitizer/camera for producing a serial binary readout of an image, which image is then provided to a computer. The computer then processes the signal from the digitizer/camera to perform "edge and contrast enhancement" such that the edges of objects can be defined and the objects distinguished from each other. Thereafter, a number of qualities of the image are quantified, include texture, fractal dimension, and conformity to library reference shapes. Such quantification is accomplished independently under two assumptions—that the target in question is a dark object on a light background, and that it is a light object on a dark background. Finally a probability of recognition is determined using the information obtained in each of the preceding analysis operations.

An advantage of the present invention is that light objects can be discerned against a dark background and dark objects can be discerned against a light background.

A further advantage of the present invention is that objects can be discerned within a wide dynamic range of lighting conditions.

Yet another advantage of the present invention is that objects can be discerned which do not conform exactly to an expected criteria.

Still another advantage of the present invention is that it is self teaching, in that criteria for discerning objects is improved through experience.

Yet another advantage of the present invention is that it can determine objects to a high confidence level.

Still another advantage of the present invention is that failure to recognize one or even more than one aspect of an object image will not necessarily result in a failure to recognize the object.

Yet another advantage of the present invention is that shadows and other potentially deceptive light aberrations are eliminated.

Still another advantage of the present invention is that it requires a minimum amount of application specific hardware.

These and other objects and advantages of the present invention will become clear to those skilled in the art in view of the description of the best presently known mode of carrying out the invention and the industrial applicability of the preferred embodiment, as described herein and as illustrated in the several figures of the drawing.

BRIEF DESCRIPTION OF THE DRAWING

FIG. 2 is a diagrammatic representation of a portion of an image such as might be analyzed according to the present inventive method.

DETAILED DESCRIPTION OF THE INVENTION

The best presently known mode for carrying out the invention is an automatic target recognition apparatus and method. The predominant expected usage of the automatic target recognition apparatus and method of the present invention is as one of several different sensor means providing information to a minefield reconnaissance and detector ("MIRADOR") system.

Figure 1:
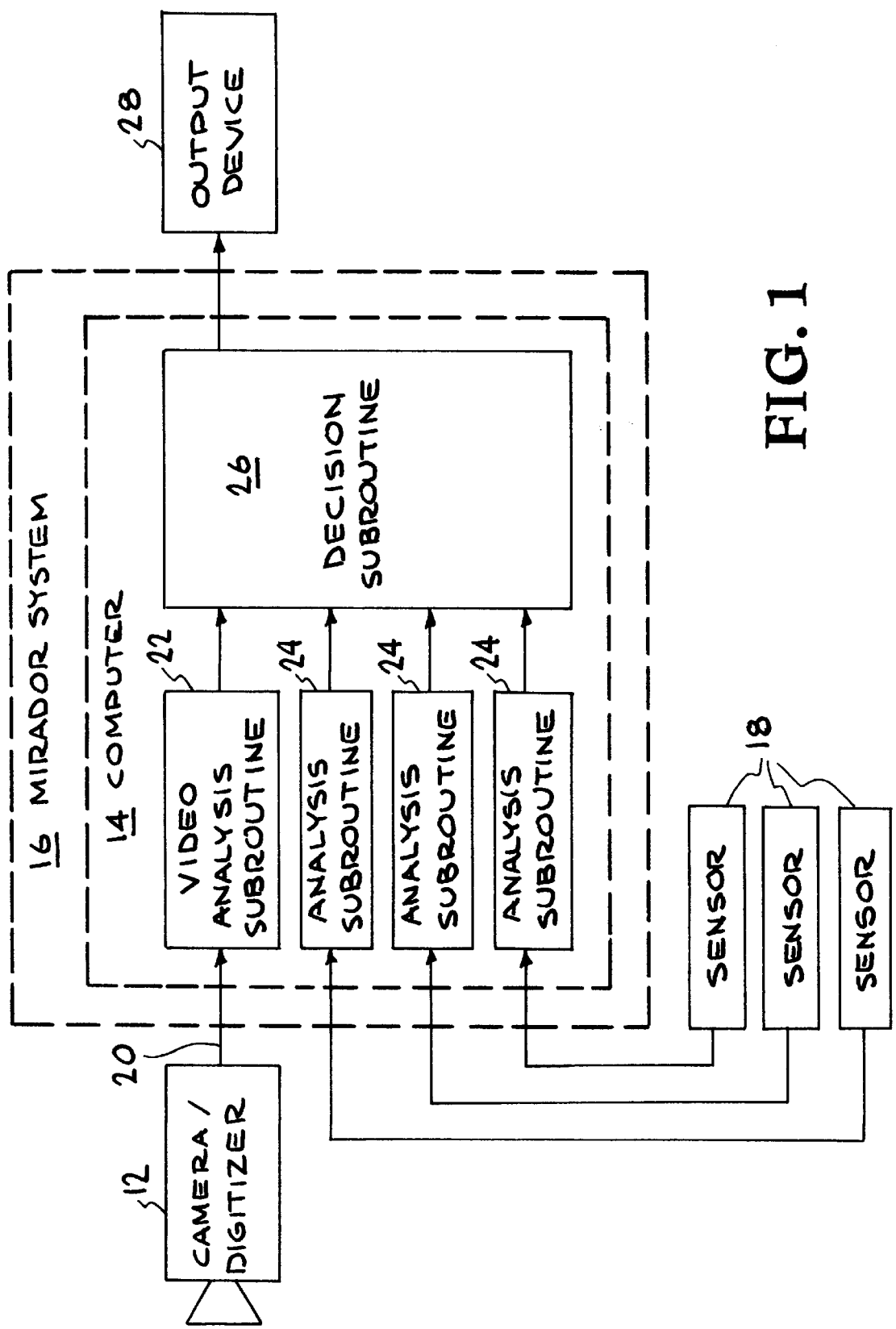
FIG. 1 is an automatic target recognition apparatus according to the best presently known embodiment of the present invention.

An automatic target recognition apparatus is shown in the block diagram of FIG. 1, and is designated therein by the general reference character 10. In the best presently known embodiment 10 of the present invention, a video camera/digitizer 12 provides a digitized signal to a computer 14. The computer 14, in the best presently known embodiment 10 of the present invention is an existing part of a MIRADOR system 16 with which the present inventive automatic target recognition apparatus 10 is used. Although the computer 14 is depicted herein, for the sake of simplicity, as a single unit, in the best presently known embodiment 10 of the invention, several parallel processors (not shown) are used to simultaneously process the several input signals reaching the computer 14, as will be discussed hereinafter. Alternatively, the computer functions described herein as being a part of the present inventive method might be performed on a "time share" basis with other functions of the MIRADOR system 16. One skilled in the art will recognize that the configuration of the computer 14 will be dictated by the speed and processing capabilities of the computer 14 as compared for the speed required for a response from the computer 14. This choice is not critical to the inventive aspects of the present invention. As is shown in the view of FIG. 1, the computer 14 is also receiving input from a plurality (three are shown in the example of FIG. 1) of additional sensors 18 which are not directly relevant to the present invention.

In the MIRADOR system 16 a digitized image signal 20 (represented here by the signal line upon which it is carried) is provided to a video analysis subroutine 22, while inputs from the other sensors 18 are provided to their own respective additional analysis subroutines 24. Finally, information resulting from the analysis subroutines 22 and 24 is provided to a decision making subroutine 26 (which is a primary aspect of the MIRADOR system), which may cause an output from the computer 14 to an output hardware device 28 (for example, to mark the location of a mine).

FIG. 2 is a diagrammatic representation of a portion of an image 30 such as might be analyzed according to the present inventive method. Shown in the image 30 are two exemplary objects 32 with corresponding shadows 34 (shown crosshatched). A plurality (26 in the example of FIG. 2) of pixels 35 are shown overlayed over the corner of the image 30. The pixels 35 will be discussed in more detail, hereinafter.

Figure 3A:
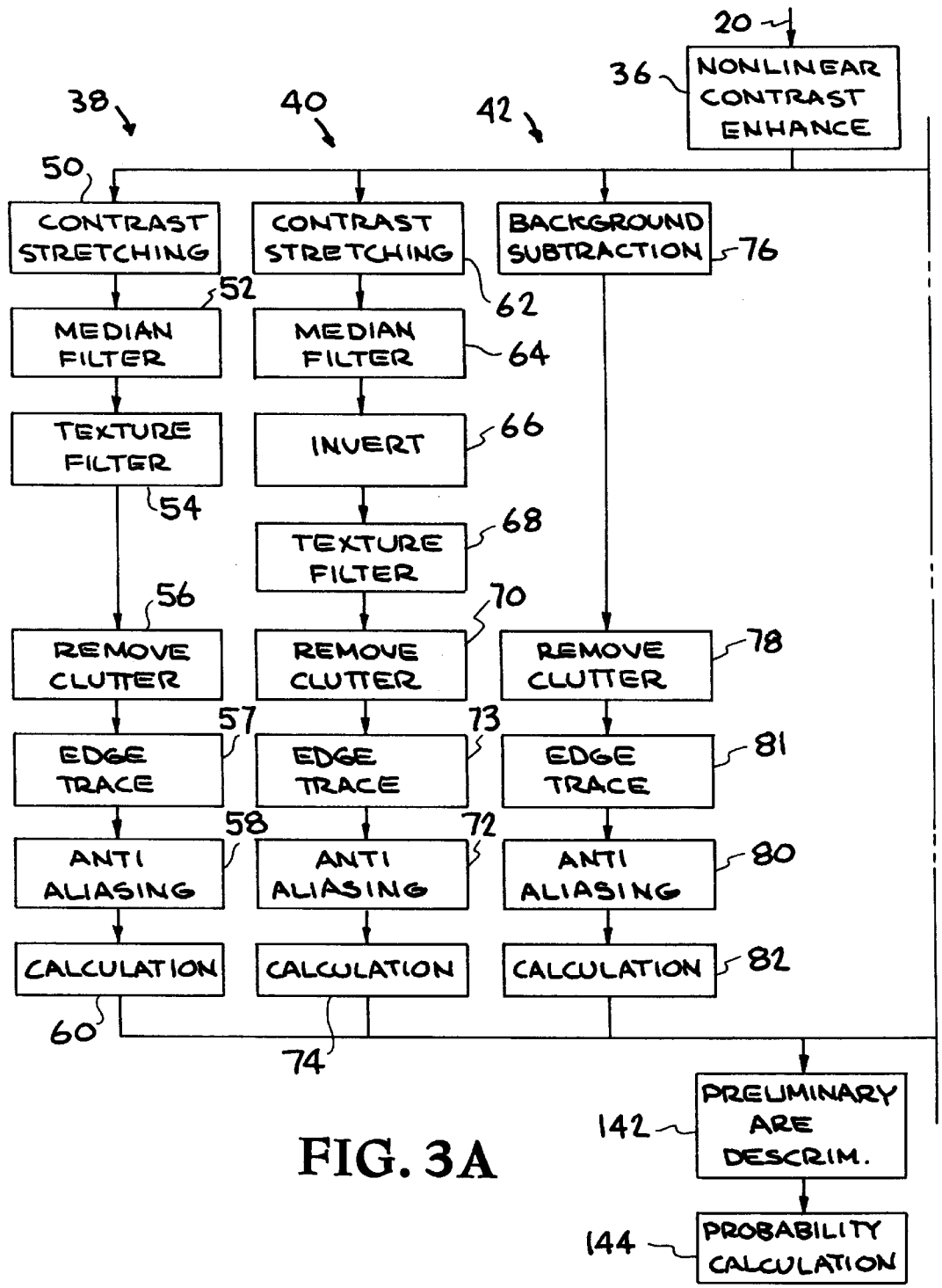
FIG. 3A and FIG. 3B, taken together, are a block diagram of an image analysis subroutine of FIG. 1.
Figure 3B:
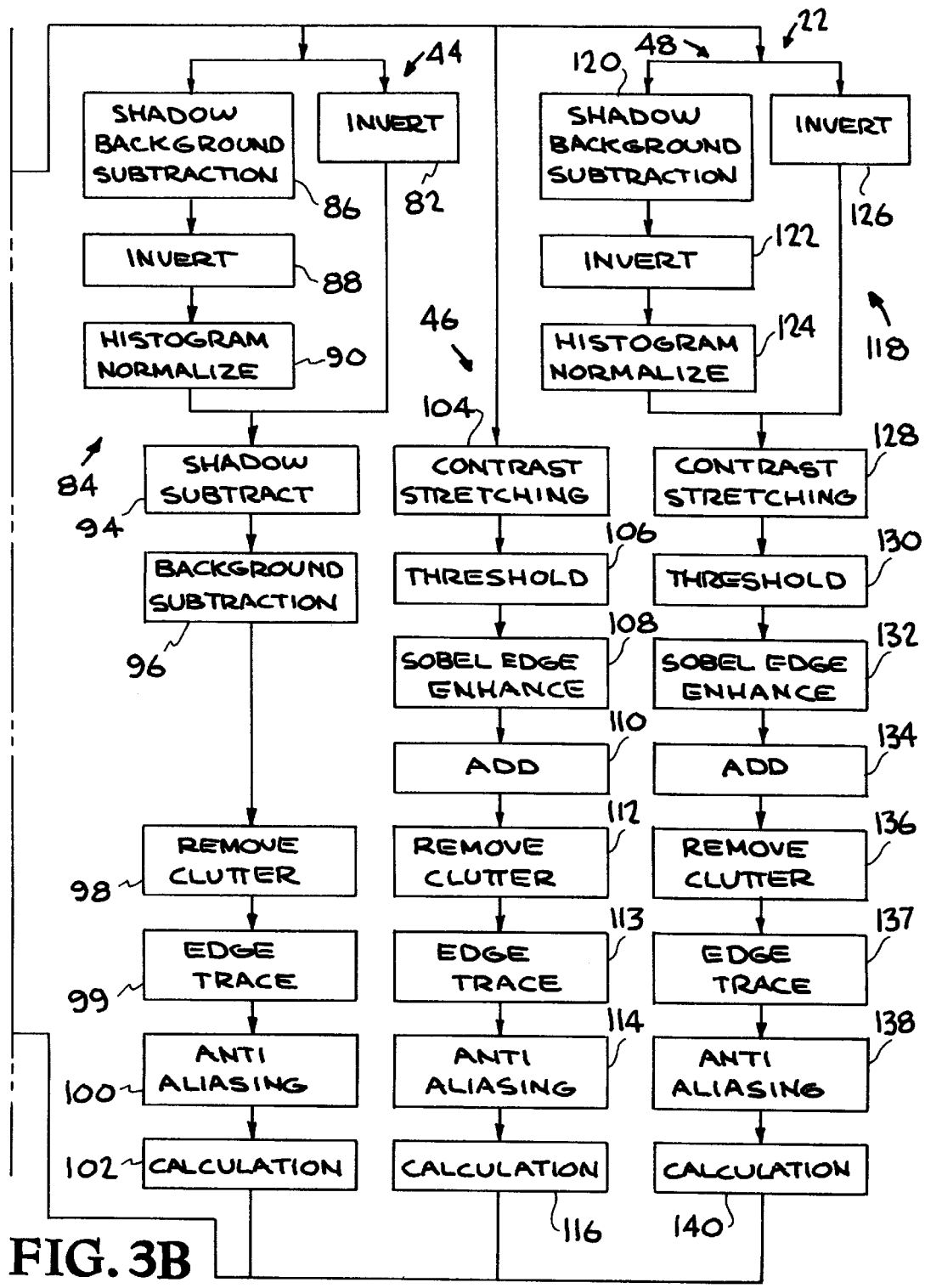

FIG. 3A and FIG. 3B, taken together, show a block diagram of the video analysis subroutine 22 of the best presently known embodiment 10 of the present invention. In accordance with the present inventive method, a non-linear contrast enhancement operation 36 is first performed on the digitized image signal 20. The digitized image signal 20 will have a numerical value assigned to each pixel 35 location within a 256 by 256 pixel 35 image 30, the numerical value being an indicator of the reflected light intensity reaching the video camera/digitizer 12 at that pixel 35 location. The intensity value of each pixel 35 will be within a range of 0 to 255, with 0 indicating essentially no illumination and 255 representing a maximum level of illumination detectable by the video camera/digitizer 12. It should be noted that there are actually no physical manifestations of the pixels 35 in the best presently known embodiment 10 of the present invention, such as there would be if the image 30 were to be reproduced on a television screen, or the like. Rather, each pixel 35 exists as a mathematical value corresponding to intensity (as previously discussed herein) paired with another set of values indicating the location of the "pixel" 35 within the image 30. One skilled in the art will be familiar with the concept of the pixel 35 as being a dot-like portion of a visual scene defined by a row value and a column value, and those familiar with the digitization of images 30 will recognize that the term "pixel" may also be used to refer to the digitized unit value which represents a physical pixel 35. The term "pixel", as used in this description of the best presently known embodiment 10 of the present invention, will generally refer to such a unit value (the intensity value) of a pixel location. It should further be noted that, as used herein, the terms "dark" and "light", when used to denote the relative intensity level values of a pixel 35, means having a relatively lower or higher unit value, respectively.

The contrast enhancement operation 36 according to the present inventive method is a non-linear numeric expansion to increase the apparent "contrast" present in the image 30. The contrast enhancement operation 36 is a well known technique in the art which is frequently also called "histogram equalization". In the contrast enhancement operation 36, the pixel 35 values within the image 30 are rescaled to cover the entire range of values available (0 to 255 in the best presently known embodiment 10 of the present invention). The pixel 35 intensity values are redistributed in such a way so as to produce a uniform population density of values over the 0–255 range. This means that the highest amount of enhancement occurs for the most populated regions of the (imaginary) histogram, whereas the least populated regions (at both high and low intensities) are strongly saturated (that is, dark pixels 35 get darker and light pixels 35 get lighter). This technique produces significant contrast difference between the objects 32 in the image 30

(FIG. 2) and a background 37 of the image 30 (the background 37 being those portions of the image 30 which do not contain objects 32 of significant interest, as will be discussed in more detail hereinafter.)

Following the contrast enhancement operation 36, the digitized image signal 20 is processed, according to the best presently known embodiment 10 of the present invention, in a positive texture chain 38, a negative texture chain 40, a positive background subtraction chain 42, a negative background subtraction chain 44, a positive edge enhancement chain 46 and a negative edge enhancement chain 48. These process analysis chains 38, 40, 42, 44, 46 and 48 are series of operations that are performed in parallel on the digitized image signal 20.

Without "real time" operator input, there is no way of knowing beforehand whether the object 32 to be identified within the field of vision of the video camera/digitizer 12 is darker or lighter than its background 37, the present inventive method has three of the process analysis chains 38, 42 and 46 based on the assumption that the object 32 is brighter (lighter) than its background 37, and the other three process analysis chains 40, 44 and 48 which assume the opposite condition. The positive chains 38, 42 and 46 are those which look for a bright object 32 on a darker background 37, and the negative chains 40, 44 and 48 are those which look for a relatively dark object 32 against a lighter background 37.

The texture chains 38 and 40 utilize texture analysis techniques to characterize the "roughness" of surfaces of the objects 32 in the image 30. The background subtraction chains 42 and 44 utilize additional contrast enhancement and background subtraction techniques to isolate objects 32 of potential interest from the background 37. The edge enhancement chains 46 and 48 utilize Sobel edge detection techniques to "sharpen" or enhance the edges of objects 32 in the image 30. A primary advantage of utilizing this combination of techniques is that if one or more of the chains 38, 40, 42, 44, 46 and 48 does not result in the identification of the object 32 of interest in the image 30, then one or more of the others will likely result in identification, if such an object 32 of interest is indeed present in the image 30.

The positive texture chain 38 has a first contrast stretching operation 50, a first median filter 52 and a first texture filter 54. The first contrast stretching operation 50 is a simple numerical expansion which first determines the range of all values within the image 30 and then numerically expands the values to fit fully the available range of values (0 through 255 in the best presently known embodiment 10 of the invention, since each value is represented by an 8 bit binary number). The first median filter 52 is a low pass type noise cleaning operation, wherein each three by three pattern of pixels 35 in the image 30 is analyzed and the central pixel 35 set to the median value of those nine pixels 35. The first median filter 52 is a well known image processing technique which is referred to by those skilled in the art as a "median filter operation".

The first texture filter 54 again looks at each three by three pattern of pixels 35 and replaces the value of the center pixel 35 by the standard deviation value of the nine pixels 35 within the pattern. This results in the values becoming essentially a "map" of the standard deviations of the three by three patterns within the image 30, which is an indication of the texture (roughness) of the imaged object 32. In the best presently known embodiment 10 of the present invention, it is thought that relative smoothness of an object 32 is relevant to the question of whether or not the object 32 in question is man-made (and, thus, more likely to be a mine), although this factor could be applied to the identification of any defined objects 32.

The positive texture chain 38 also has a first remove clutter operation 56, which operation is referred to as an associative filter. The first remove clutter operation 56 is performed by numerically doing the equivalent of running a moving five by five pixel 35 "mask" over the image 30. In instances where relatively few of the twenty five pixels 35 within the mask have non-zero values, the central pixel 35 value (of each successive imaginary "mask") is set to zero. Otherwise, the central pixel 35 value remains unchanged. This has the effect of eliminating small background objects or clutter which are unrelated to the objects 32 (mines, in the best presently known embodiment 10 of the present invention) which are to be detected.

Following the first remove clutter operation 56 is a first edge trace operation 57. The first edge trace operation is a well known device wherein a numerical "map" of the coordinates of edges of objects 32 within the image 30 are noted, since subsequent processing steps function on areas defined by such edges, as will be discussed hereinafter. Following the first edge trace operation 57 is a first anti-aliasing operation 58. The first anti-aliasing operation 58 is a conventional operation, known in the art, for removing unwanted high frequency effects, which function correlates to smoothing the edges of a visual image 30. As will be recognized by one skilled in the art, the first anti-aliasing operation 58 will "fill in" and/or delete pixels 35 along the edge of (perceived) objects 32, thus effectively smoothing the edges of each identified object 32 within the image 30.

A first calculation operation 60 performs several calculations to determine the recognition of an object 32. The first calculation operation 60 is a "feature extraction" operation where characteristics or "features" of the objects 32 are determined (calculated). The first calculation operation 60 will be discussed in more detail, hereinafter.

The negative texture chain 40 is like the positive texture chain 38 in that a second contrast stretching operation 62 performs the same function as does the first contrast stretching operation 50, a second median filter 64 performs the same operation as does the first median filter 52, and a second texture filter 68 performs the same function as does the first texture filter 54. The negative texture chain 40 differs from the positive texture chain 38 in that a first invert operation 66 is inserted between the second median filter 64 and the second texture filter 68. The first invert operation 66 simply replaces each pixel 35 value according to the formula $X_n = 255 - X_o$, where $X_o$ is the old value associated with that pixel 35, and $X_n$ is the new value. As can be appreciated, this amounts to a displacement of each value to the opposite side of the median value (128) by an amount equal to its original displacement from that value. One skilled in the art will recognize that this will result in a reverse or "negative" image 30. Therefore, as previously discussed herein, the negative texture chain 40 will serve to define objects 32 in an image 30 based on texture in like manner as does the positive texture chain 38 except that, where the positive texture chain 38 might define a lighter object 32 on a dark background 37, the negative texture chain 40 might define a darker object 32 on a light background 37. In the negative texture chain 40, a second remove clutter operation 70, a second anti-aliasing operation 72, a second edge trace operation 73 and a second calculation operation 74 perform functions like those previously described in relation to the first remove clutter operation 56, the first edge trace operation 57, the first anti-aliasing operation 58 and the first calculation operation 60, respectively.

The positive background subtraction chain 42 has a first background subtraction operation 76 which is an image thresholding operation in which all of the pixel 35 values in the image 30 which fall below a predetermined gray level are set to zero, thus effectively eliminating the background 37 in the image 30. The predetermined level is identified by examination of the image histogram of the specific system (the MIRADOR system 16, in the case of the best presently known embodiment 10 of the present invention), to determine at which level specified objects 32 begin to contribute significantly to the image 30.

The positive background subtraction chain 42 also has a third remove clutter operation 78, a third anti-aliasing operation 80, a third edge trace operation 81 and a third calculation operation 82 which perform functions like those previously described in relation to the first remove clutter operation 56, the first edge trace operation 57, the first anti-aliasing operation 58 and the first calculation operation 60, respectively.

The negative background subtraction chain 44 performs a function like that of positive background subtraction chain 42, except that the background 37 that is to be subtracted is assumed to be a lighter background 37 surrounding a darker object 32. Special consideration must be given here to the fact that, in this case, a dark shadow 34 might erroneously be considered to be an object 32 (or part of an object 32), since the shadow 34, like the supposed object 32, would be dark. Therefore, in the negative background subtraction chain 44, a first shadow removal subroutine 84 has a first shadow background subtraction operation 86, a second invert operation 88, and a first histogram normalize operation 90 which operate in parallel with a third invert operation 92. The second invert operation 88 and the third invert operation 92 operate in like manner as has been previously described herein in relation to the first invert operation 66. The first shadow background subtraction operation 86 is like the first background subtraction operation 76, except that the background 37 that is subtracted is the very darkest portions of the image 30, which darkest portions are presumed, for the purposes of this operation, to be shadows 34. This is effectively accomplished by deleting the rest of the image 30 (just from the instant signal), by inverting the remaining portion of the image 30 (which now should contain just the shadows 34) in the second invert operation 88. Then, in the histogram normalize operation 90, the processed image 30 is readjusted in range to readjust intensities of the pixels 35 to a range consistent with their original range (prior to the first shadow background subtraction operation 86).

A first shadow subtract operation 94 combines the results of the preceding operations of the negative background subtraction chain 44 to effectively eliminate shadows 34. Since, as been just previously described herein, the output of the first histogram normalize operation 90 will contain essentially the inverse values for those portions of the image 30 which have been identified as shadows 34, the recombination process produces an image 30 in which the shadows 34 are, in effect, neutralized. A second background subtraction operation 96 functions as does the first background subtraction operation 76 (on the previously inverted data) to eliminate any surviving noise in the image 30, and a fourth remove clutter operation 98, a fourth edge trace operation 99, a fourth anti-aliasing operation 100 and a fourth calculation operation 102 which perform functions like those previously described in relation to the first remove clutter operation 56, the first edge trace operation 57, the first anti-aliasing operation 58 and the first calculation operation 60, respectively.

The positive edge enhancement chain 46 has a third contrast stretching operation 104, a first threshold operation 106, a first Sobel edge enhance operation 108 and a first add operation 110. The first threshold operation 106 and the first Sobel edge enhance operation 108 are well known techniques in the field in which intensity gradients are first identified in the image (the first threshold operation 106) and then the edges of objects 32 are identified as existing at the location of relatively sharp gradients (the first Sobel edge enhance operation 108). In the first add operation 110, the output of the first Sobel edge enhance operation 106 is overlayed onto the image 30 as it existed prior to the Sobel edge enhance operation 106 such that the image 30 retains its original characteristics with the addition of enhanced edges on the objects 32 therein.

The positive edge enhancement chain 46 also has a fifth remove clutter operation 112, a fifth edge trace operation 113, a fifth anti-aliasing operation 114 and a fifth calculation operation 116 which perform functions like those previously described in relation to the first remove clutter operation 56, the first edge trace operation 57, the first anti-aliasing operation 58 and the first calculation operation 60, respectively.

The negative edge enhancement chain 48 has a second shadow removal subroutine 118 with a second shadow background subtraction operation 120, a fourth invert operation 122, and a second histogram normalize operation 124, a fifth invert operation 126 and a second shadow subtract operation 127 which, in combination, function to remove the effects of the shadows 34 as previously described in relation to the first shadow removal subroutine 84. Following the second shadow removal subroutine 118, the negative edge enhancement chain 48 has a fourth contrast stretching operation 128, a second threshold operation 130, a second Sobel edge enhancement 132 and a second add operation 134, which function as previously described in relation to the third contrast stretching operation 104, the first threshold operation 106, the first Sobel edge enhance 108 and the first add operation 110, respectively. The negative edge enhancement chain 48 further has a sixth remove clutter operation 136, a sixth edge trace operation 137, a sixth anti-aliasing operation 138 and a sixth calculation operation 140 which perform functions like those previously described in relation to the first remove clutter operation 56, the first edge trace operation 57, the first anti-aliasing operation 58 and the first calculation operation 60, respectively.

Now beginning a more detailed discussion of the calculation operations 60, 74, 82, 102, 116 and 140, as has been discussed previously, the calculation operations 60, 74, 82, 102, 116 and 140 are for making a preliminary determination of the recognition of an object 32. It can be seen that in each of the process analysis chains 38, 40, 42, 44, 46 and 48 potential objects 32 of interest are defined within the image 30, either by virtue of difference in texture, differences in brightness as compared to background 37, or by determination of edges. The data thus obtained provides the necessary information to define the shape of such objects 32 using a conventional tracing algorithm. The particular calculations performed on such shape information, in the best presently known embodiment 10 of the present invention, are specific to the application, which is the recognition of land mines. The shape data is compared to that of a library of known mine types, and the degree of difference between the noted aspects of any object 32 and that of the known mine types is determined.

This is much like character recognition ("OCR") operations in an OCR program, wherein the geometry of the defined object is compared to a library of known shapes. In the best presently known embodiment 10 of the present invention, comparisons are made to three (3) common mine shapes, and a geometric property error value ("E") is assigned to correspond to the comparison of the object 32 and that library shape which most closely corresponds thereto. A measure of asymmetry is assigned to each defined object 32 and a fractal analysis is performed by calculating the ratio of the edge length to the area of each defined object 32. This results in a fractal dimension value which is a measure of target edge contortion ("f"). The equations used are specific to the application and will be disclosed in more detail hereinafter.

Having thus analyzed the image signal 20, as described, individually (in parallel) in each of the process analysis chains 38, 40, 42, 44, 46 and 48, the location of each recognized object 32 within the image 30, as determined by each of the process analysis chains 38, 40, 42, 44, 46 and 48, is examined in combining the data (since there may be duplication if more than one of the process analysis chains 38, 40, 42, 44, 46 and 48 has recognized the same object 32) and a record of each distinct object is provided to a preliminary area discrimination operation 142. Since, in the present application, the video camera/digitizer 12 is fixed on the automatic target recognition apparatus 10 such that it is a fixed distance from objects 32 to be examined, the size of the object 32 within the image 30 can be determined directly, and any object which is not within plus or minus twenty percent of the size (area) of a library shape is eliminated from consideration. This simple means of elimination might not be possible in other applications wherein the distance of the camera/digitizer 12 from the object 32 is not fixed.

A record of all objects 32 which pass through the preliminary area discrimination operation 142 is then provided to a probability calculation operation 144. The probability calculation operation 142 operates according to the equation:

$$P_n = (10 - CE_n f_n e^{X_n})$$

where $P_n$ is the calculated probability (in the range zero through ten, rather than zero through one) that the object 32 n is a mine, and $e^{X_n}$ is a measure of the symmetry of the object 32, with this form being chosen to accentuate the difference between a symmetrical object and an asymmetrical object, since objects with a high symmetry are very likely to be man-made objects, which is particularly relevant in the present application. C is a constant used to scale the product of $E_n$ $f_n$ $e^{X_n}$ to within the range zero through ten. It should be noted that the function $E_n$ $f_n$ $e^{X_n}$ is such that it is inversely proportional to the calculated probability ($P_n$) that the object 32 (n) is a mine. $E_n$ is the error factor determined in the calculation operations 60, 74, 82, 102, 116 and 140 according to the equation:

$$E_n = A_n + p_n + f_n$$

Where $A_n$, $p_n$ and $f_n$ are the percentage differences between the area, perimeter and fractal dimension, respectively, of an object 32 and the most similar library shape, and:

$$X_n = \sqrt{\left(\frac{X_a}{M}\right)^2 + \left(\frac{Y_a}{M}\right)^2}$$

Where:

$$X_a = \sum_{i=1}^{M} \frac{1}{X_i - X_{cm}} \text{ and } X_{cm} = \frac{\sum_{i=1}^{M} X_i}{M}$$

and;

$$Y_a = \sum_{i=1}^{M} \frac{1}{Y_i - Y_{cm}} \text{ and } Y_{cm} = \frac{\sum_{i=1}^{M} Y_i}{M}$$

Where $X_{cm}, Y_{cm}$ is the center (referred to as the center of mass in this field, although a physicist will recognize that these coordinates do not necessarily define the true center of mass in the conventional sense) of the object 32 shape, $X_i, Y_i$ are the pixel coordinates of each defined point in an object 32, and M is the number of defined points in an object 32.

In many applications, the probability determination obtained in the probability calculation operation 144 would be a sufficiently reliable indicator to trigger whatever action is required by the application. However, in the best presently known embodiment 10 of the present invention, the value $P_n$ is passed on to the decision making subroutine 26 of the MIRADOR system 16 for a final decision making operation. In the best presently known embodiment 10 of the present invention, the output of the video analysis subroutine 22 is merged with the output of the additional analysis subroutines 24 (which have processed information provided by the additional sensors 18) in the decision making subroutine 26 for making a final determination regarding the presence of a mine.

It is an important aspect of the present invention that the equation used in the calculation operations 60, 74, 82, 102, 116 and 140 and the probability calculation operation 144 can be refined and modified to improved recognition of any object 32 without altering the basic operations of the method, as described herein. In the best presently known embodiment 10 of the present invention, a calculation and values have been chosen which the inventors believe look to the facts which will most likely distinguish a mine from background earth, rocks, grass and the like. Therefore, "learning" from experience in this manner is a part of the inventive process, and it is anticipated that "learning subroutines" can be written to allow the best presently known embodiment 10 of the invention to further refine the probability calculation operation 144. Furthermore, even if very different requirements were to be introduced, this learning process could thus modify the probability calculation operation 144 to accommodate the recognition of essentially any type of object 32 (with varying degrees of confidence, of course).

Various modifications may be made to the invention without altering its value or scope. The steps given herein could be shifted in order and/or additional test criteria could be added. For example, an absolute size criteria could be added such that only objects 32 of a certain absolute size (as determined by the portion of the image 30 taken up thereby, the distance from the video camera/digitizer 12 to the object 32 in question being known), such that only objects 32 within a set size range would be subjected to the analysis described herein. Another obvious variation would be to eliminate operations unnecessary to a specific operation.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The automatic target recognition apparatus 10 is an image recognition method performed substantially in software of the minefield and reconnaissance and detector ("MIRADOR") system computer. The MIRADOR system integrates a variety of sensory inputs using a unique decision making method to make ultimate decisions as to whether or not a land mine is present. (The MIRADOR system also can be used in applications such as the clearing of toxic waste dumps.) While the MIRADOR system is designed to integrate a variety of sensory input devices, the basic system is generally independent of the exact nature of such input devices. To date, the MIRADOR system has been operated with sensors such as magnetic sensors, radar, and the like. The inventive image recognition method and means has been developed to provide an additional data input means to the MIRADOR system. Clearly, if the present inventive image recognition system is to be used as a data input to the MIRADOR system, the ability to recognize systems at a high confidence level is required.

It can be appreciated that a great advantage of the present inventive method is that it integrates a number of evaluation criteria, each of which may be assigned a lesser or greater degree of importance based upon the particular type of object 32 to be located and the ambient background conditions. The fact that these factors can be "fine tuned" base upon previous success or failure of recognition, and the fact that this learning process can be easily automated, makes the present inventive method not only especially adaptable within the context of the MIRADOR system, but also a potentially valuable visual sensor means in any application wherein sufficient computing power is available to shift much of the burden away from hardware and into the software, as described herein.

The automatic target recognition apparatus 10 may be utilized in essentially any application wherein conventional video recognition systems are used, although it may be more adaptable and powerful than is required in many very specific applications. Moreover, it is anticipated that the increasingly reliable recognition achievable using the present inventive method will open up new areas within which object recognition may be used. Therefore, it is expected that the inventive method and means will be acceptable in the field as a substitute for the conventional visual object recognition systems. For these and other reasons, it is expected that the utility and industrial applicability of the invention will be both significant in scope and long-lasting in duration.

What is claimed is:

1. An automatic target recognition apparatus for recognizing an object within a digitized image, comprising:
a video camera and digitizer for producing a digitized image;
and a computer for processing the digitized image, wherein;
the image is processed in a plurality of parallel analysis chains, each of said analysis chains being a distinct means for analyzing the image such that the object may be identified by one or more of said parallel analysis chains.

2. The target recognition apparatus of claim 1, wherein:
one or more of said chains causes the digitized image to be numerically inverted prior to processing such that dark and light areas of the image are reversed.

3. The target recognition apparatus of claim 1, wherein:
a fractal dimension of objects within the digitized image is obtained in one or more of said chains, the fractal dimension being a ratio of the perimeter of the object relative to the surface area of the object.

4. The target recognition apparatus of claim 1, wherein:
the surface texture of the object is determined as a function of the standard deviation of the set of values representing pixel intensities within the area of the object in the image.

5. The target recognition apparatus of claim 1, wherein:
the object to be identified is a land mine.

6. The target recognition apparatus of claim 5, wherein:
one or more of said chains compares the shape of the object to data stored in the computer.

7. A method for using a computer to recognize objects within a digitized video image, the method comprising:
processing the digitized video image in a plurality of parallel processing chains, wherein;
one or more of the processing chains for analyzing the content of the video image includes a series of processing steps for identifying a relatively light target against a relatively dark background, and;
one or more of the processing chains includes a numerical inversion operation for inverting the shading within the image such that a relatively dark image on a relatively light background becomes equivalent to a relatively light image on a relatively dark background.

8. The method of claim 7, wherein:
the quantity of parallel processing chains is six;
three of the processing chains process the video image without inversion, such that lighter images may be distinguished from darker backgrounds, and;
the remaining three processing chains invert the video image prior to processing, such that darker images may be distinguished from lighter backgrounds.

9. The method of claim 7, wherein:
at least one of the processing chains includes a shadow background subtraction subroutine.

10. The method of claim 7, wherein:
at least one of the processing chains includes a texture filter subroutine for discriminating the object based upon its surface texture.

11. The method of claim 7, wherein:
each of the parallel processing chains independently determines if an object has been recognized; and
the probability that an object has been recognized is determined by combining the results of all of the parallel processing chains.

12. In a computerized mine detection apparatus having a plurality of sensors for sensing objects and a computer for receiving and processing input from the sensors to determine if any if the objects is a mine, an improvement comprising;
a video camera for producing a digitized video image, and;
a plurality of processing series, each of said processing series independently processing the video image such that each of said processing series can independently determine if a mine is present in the image.

13. The computerized mine detection apparatus of claim 12, wherein:

each of the processing series independently analyzes the objects within the video image and then independently determines if any of the objects is a mine.

14. The computerized mine detection apparatus of claim 12, wherein:

the camera is positioned at a fixed distance from the objects, such that the physical dimensions of the objects can be compared to stored physical dimension data.

15. The computerized mine detection apparatus of claim 12, wherein:

one or more of the processing series analyzes the surface texture of the object.

16. The computerized mine detection apparatus of claim 12, wherein:

one or more of the processing series determines a fractal dimension of the objects, the fractal dimension being the ratio of the perimeter of each of the objects to the area of each such object.

17. The computerized mine detection apparatus of claim 12, wherein:

one or more of the processing series inverts a light intensity of each of portion of the object within the image prior to discriminating the objects.

18. The computerized mine detection apparatus of claim 12, wherein:

one or more of the processing series analyzes the objects within the image by enhancing the edges of the objects.

19. The computerized mine detection apparatus of claim 12, wherein:

one or more of the processing series includes a shadow background subtraction subroutine.

* * * * *